(12) United States Patent
Sachdeva et al.

(10) Patent No.: US 8,026,639 B1
(45) Date of Patent: *Sep. 27, 2011

(54) SCHEME FOR OPERATION OF STEP WAVE POWER CONVERTER

(75) Inventors: Rishi Sachdeva, Calgary (CA); Russell Jack Morash, Calgary (CA); Dubravko Bosnjak, Calgary (CA); Brent Earle Harris, Millarville (CA)

(73) Assignee: Sustainable Energy Technologies, Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/854,817

(22) Filed: Aug. 11, 2010

Related U.S. Application Data (63) Continuation of application No. 11/830,697, filed on Jul. 30, 2007, now Pat. No. 7,808,125.

(60) Provisional application No. 60/820,942, filed on Jul. 31, 2006.

(51) Int. Cl.
*H02J 7/00* (2006.01)

(52) U.S. Cl. ............................. 307/82; 307/30; 363/55

(58) Field of Classification Search .............. 323/301, 323/361, 222, 207; 307/42, 66, 81, 82, 85, 307/83, 43, 77, 30; 363/41–44, 56.01, 58, 363/71, 131, 132, 16–20, 89, 95, 55
See application file for complete search history.

(56) References Cited

U.S. PATENT DOCUMENTS

| | | | |
|---|---|---|---|
| 3,491,282 A | 1/1970 | Heinrich | |
| 3,581,212 A | 5/1971 | McMurray | |
| 3,628,123 A | 12/1971 | Rosa et al. | |
| 3,648,149 A | 3/1972 | Brown et al. | |
| 3,792,286 A | 2/1974 | Meier | |
| 3,793,578 A | 2/1974 | Rettig | |
| 4,032,832 A | 6/1977 | Miller | |
| 4,159,513 A | 6/1979 | Gemp | |
| 4,202,933 A | 5/1980 | Reiser et al. | |
| 4,330,367 A | 5/1982 | Musick | |
| 4,366,532 A | 12/1982 | Rosa et al. | |
| 4,367,196 A | 1/1983 | Wende et al. | |

(Continued)

FOREIGN PATENT DOCUMENTS

CA 2658087 6/2001

(Continued)

OTHER PUBLICATIONS

Tarun Gupta, R.R., Bordeaux, R.M. Nelms and John Y. Hung, Implemnetation of a Fuzzy Controller for DC-DC Converters Using an Inexpensive 8-B Microcontroller, 1997 IEEE Transactions on Industrial Electronics, IEEE Oct. 1, 1997; pp. 661-668; vol. 44, No. 5; New York, USA.

(Continued)

*Primary Examiner* — Rajnikant B Patel
(74) *Attorney, Agent, or Firm* — Stolowitz Ford Cowger LLP (57) ABSTRACT

A step wave power converter includes a plurality of transformers each configured to receive a Direct Current (DC) voltage from one or more independently generated power sources. Each transformer comprising a primary winding and a secondary winding. A plurality of bridge circuits control different DC voltage inputs from one of the multiple independently generated power sources into the primary windings. One or more processors are configured to use a Phase-Shifted Carrier Pulse Width Modulation (PSCPWM) scheme to operate the bridge circuits in order to produce steps for a step wave Alternating Current (AC) output from the secondary windings.

20 Claims, 8 Drawing Sheets

U.S. PATENT DOCUMENTS

| | | | |
|---|---|---|---|
| 4,375,662 | A | 3/1983 | Baker |
| 4,510,434 | A | 4/1985 | Assbeck et al. |
| 4,628,438 | A | 12/1986 | Montague |
| 4,678,983 | A | 7/1987 | Rouzies |
| 4,689,133 | A | 8/1987 | McIlhenny |
| 4,736,151 | A | 4/1988 | Dishner |
| 4,800,481 | A | 1/1989 | Knaffl et al. |
| 5,041,957 | A | 8/1991 | Dhyanchand et al. |
| 5,132,892 | A | 7/1992 | Mizoguchi |
| 5,229,652 | A | 7/1993 | Hough |
| 5,327,071 | A | 7/1994 | Frederick et al. |
| 5,334,463 | A | 8/1994 | Tajima et al. |
| 5,366,821 | A | 11/1994 | Merritt et al. |
| 5,373,433 | A | 12/1994 | Thomas |
| 5,376,912 | A | 12/1994 | Casagrande |
| 5,631,820 | A | 5/1997 | Donnelly et al. |
| 5,642,275 | A | 6/1997 | Peng et al. |
| 5,683,793 | A | 11/1997 | Malhotra |
| 5,696,439 | A | 12/1997 | Presti et al. |
| 5,714,874 | A | 2/1998 | Bonnefoy |
| 5,734,258 | A | 3/1998 | Esser |
| 5,757,633 | A | 5/1998 | Bowles |
| 5,763,113 | A | 6/1998 | Meltser et al. |
| 5,847,941 | A | 12/1998 | Taguchi et al. |
| 5,859,772 | A | 1/1999 | Hilpert |
| 5,896,281 | A | 4/1999 | Bingley |
| 5,898,282 | A | 4/1999 | Drozdz et al. |
| 5,933,339 | A | 8/1999 | Duba et al. |
| 5,986,909 | A | 11/1999 | Hammond |
| 6,015,634 | A | 1/2000 | Bonville et al. |
| 6,072,710 | A | 6/2000 | Chang |
| 6,096,449 | A | 8/2000 | Fuglevand et al. |
| 6,175,217 | B1 | 1/2001 | DaPonte et al. |
| 6,184,593 | B1 | 2/2001 | Jungreis |
| 6,188,199 | B1 | 2/2001 | Beutler et al. |
| 6,198,178 | B1 * | 3/2001 | Schienbein et al. ............ 307/82 |
| 6,225,794 | B1 | 5/2001 | Criscione et al. |
| 6,237,424 | B1 | 5/2001 | Salmasi et al. |
| 6,242,120 | B1 | 6/2001 | Herron |
| 6,243,277 | B1 | 6/2001 | Sun et al. |
| 6,255,008 | B1 | 7/2001 | Iwase |
| 6,275,018 | B1 | 8/2001 | Telefus et al. |
| 6,282,111 | B1 | 8/2001 | Illingworth |
| 6,304,068 | B1 | 10/2001 | Hui et al. |
| 6,324,042 | B1 | 11/2001 | Andrews |
| 6,340,851 | B1 | 1/2002 | Rinaldi et al. |
| 6,377,874 | B1 | 4/2002 | Ykema |
| 6,396,137 | B1 | 5/2002 | Klughart |
| 6,428,917 | B1 | 8/2002 | Lacy et al. |
| 6,522,955 | B1 | 2/2003 | Colborn |
| 6,556,461 | B1 | 4/2003 | Khersonsky et al. |
| 6,587,766 | B2 | 7/2003 | Bruckner |
| 6,608,404 | B2 | 8/2003 | Schienbein |
| 6,628,011 | B2 | 9/2003 | Droppo |
| 6,656,618 | B2 | 12/2003 | Iwase |
| 6,738,692 | B2 | 5/2004 | Schienbein |
| 6,765,315 | B2 | 7/2004 | Hammerstrom |
| 6,867,987 | B2 | 3/2005 | Cheng et al. |
| 6,882,063 | B2 | 4/2005 | Droppo |
| 6,979,916 | B2 | 12/2005 | Schienbein |
| 7,087,332 | B2 | 8/2006 | Harris |
| 7,110,272 | B2 | 9/2006 | Nojima |
| 2003/0214824 | A1 | 11/2003 | Corzine |
| 2004/0004403 | A1 | 1/2004 | Schienbein et al. |
| 2004/0095113 | A1 | 5/2004 | Kernahan et al. |
| 2008/0298104 | A1 | 12/2008 | Sachdeva |

FOREIGN PATENT DOCUMENTS

| | | | |
|---|---|---|---|
| CA | | 2394761 | 6/2009 |
| DE | | 19626447 | 3/1998 |
| DE | | 19635606 | 3/1998 |
| DE | | 19810468 | 11/2006 |
| EP | | 390184 | 3/1990 |
| EP | | 0614771 | 9/1994 |
| EP | | 0667246 | 8/1995 |
| EP | | 0703652 | 3/1996 |
| EP | | 0756372 | A1 | 1/1997 |
| EP | | 0780750 | A2 | 6/1997 |
| EP | | 0874448 | 10/1998 |
| EP | | 913918 | 5/1999 |
| EP | | 0967086 | 12/1999 |
| EP | | 1254505 | 11/2002 |
| EP | | 10956002.8 | 6/2004 |
| GB | | 2295508 | 5/1996 |
| GB | | 2330254 | 4/1999 |
| JP | | 02-101968 | 4/1990 |
| JP | | 03-143268 | 6/1991 |
| JP | | 05-23791 | 2/1993 |
| JP | | 05-38154 | 2/1993 |
| JP | | 07-67346 | 3/1995 |
| JP | | 07-194118 | 7/1995 |
| JP | | 07-222455 | 8/1995 |
| JP | | 08-070581 | 12/1996 |
| JP | | 10014133 | 1/1998 |
| JP | | 10217603 | 8/1998 |
| JP | | 11-89242 | 3/1999 |
| JP | | 2001037101 | 9/2001 |
| WO | | WO9528285 | 10/1995 |
| WO | | 99/41828 | 8/1999 |
| WO | | 01/47095 | 6/2001 |
| WO | | 02/011267 | 2/2002 |
| WO | | 2009/044293 | 9/2009 |

OTHER PUBLICATIONS

Bor-Ren Lin, "Analysis of Fuzzy Control Method Applied to DC-DC Converter Control," Proceedings of the Annual Applied Power Electronics Conference and Exposition (APEC) San Diego; Mar. 7-11, 1993, pp. 22-28; New York, USA.

W.C. So. C.K. Tse and Y.S. Lee, "A Fuzzy Controller for DC-DC Converters," Power Electronics Specialists Conference PESC '94 Record, 25th Annual IEEE Taipei, Taiwan; Jun. 20-25, 1994; pp. 315-320; Taipei, Taiwan.

Claudio Manoel da Cunda Duarte and Ivo Barbi, "A New Family of ZVS-PWM Active-Clamping DC-to-DC Bosst Converters: Analysis, Design, and Experimentation," IEEE Transactions on Power Electronics, vol. 12, No. 5 Sep. 1997, pp. 824-831.

J. Rodriquez, J. Lai and F.Z. Peng; multilevel Inverters: A Survey of Topologies, Controls and Applications; IEEE Transactions on industrial Electronics; Aug. 2002, pp. 724-738; vol. 49, No. 4.

B.P. McGrath and D.G. Holmes; Multicarrier PWM Stragegies for Multilevel Inverters; IEEE Transactions on Industrial Electronics; Aug. 2002; pp. 858-867; vol. 49, No. 4.

J. Lai and F.Z. Peng; Multilevel Converters-A New Breed of Power Converters; IEEE Transactions on Industrial Applications; May/Jun. 1996; pp. 509-517; vol. 32, No. 3.

G. Carrara, S. Gardella, M. Marchesoni, R. Salutari and G. Sciutto; A New Multilevel PWM Method; A Theoretical Analysis; IEEE Transactions on Power Electronics; Jul. 1992; pp. 497-505; vol. 7, No. 3.

H. Weiss; Low Voltage Commissioning of the System-Tie Converter Muldenstein/Nuernberg; Electronic Engineering Proceedings 2002 APEIE 2002 6th International Conference of Actual Problems of, Sep. 2002, pp. 273-278.

F. Caricchi et al.; Study of Bi-directional buck-boost converter topologies for appliction in electrical vehicle motor drives; Applied Power Electronics Conference and Exposition APEC '98 Conference Proceedings; Feb. 15, 1998; pp. 287-293; New York, NY, USA.

International Search Report for PCT/US00/26788; Date of mailing Jun. 26, 2001; ISA/EPO.

International Preliminary Search Report for PCT/US01/23681; Date of Completion Jul. 30, 2003; IPEA/US.

International Search Report for PCT/US01/23681; Date of mailing Jun. 28, 2008; ISA/EPO.

Boeck et al., "Bremen's 100-MW static frequency link," ABB Review, Sep. 10, 1996, pp. 4-17.

International Search Report for PCT/IB2008/003541; Date of mailing May 26, 2009.

Written Opinion for PCT/IB0803541; Mailing date May 26, 2009.

International Preliminary Search Report for PCT/US00/26788; Date of Completino of report Sep. 6, 2001; ISA/EPO.

EP Search Report for EP Application No. 0967086; Mailing date Oct. 28, 1998.

Stolowitz Ford Cowger Listing of Related Cases, Sep. 9, 2010.

Stolowitz Ford Cowger, LLP, Listing of Related Cases, May 3, 2011.

* cited by examiner

SCHEME FOR OPERATION OF STEP WAVE POWER CONVERTER

This application is a continuation application of Ser. No. 11/830,697 filed Jul. 30, 2007, which claims priority to provisional application Ser. No. 60/820,942, filed on Jul. 31, 2006, which are both herein incorporated by reference in their entirety. U.S. Pat. No. 6,198,178, entitled: Step Wave Power Converter, issued Mar. 6, 2001, is also incorporated in its entirety.

FIELD OF THE INVENTION

The disclosure relates generally to power converters.

BACKGROUND OF THE INVENTION

The general class of multilevel inverters comprises of, among others, a type known as Cascaded Multilevel Inverters. Cascaded inverters have been used in the industry for high power applications. Among the techniques for controlling these cascade converters include a carrier-based Pulse Width Modulation (PWM) scheme known as phase-shifted carrier PWM (PSCPWM).

DETAILED DESCRIPTION

A Phase-Shifted Carrier Pulse Wave Modulation (PSCPWM) scheme is implemented in a step wave power converter for a stand-alone inverter mode of operation. The foregoing and other objects, features and advantages of the invention will become more readily apparent from the following detailed description of a preferred embodiment of the invention which proceeds with reference to the accompanying drawings.

Figure 1:
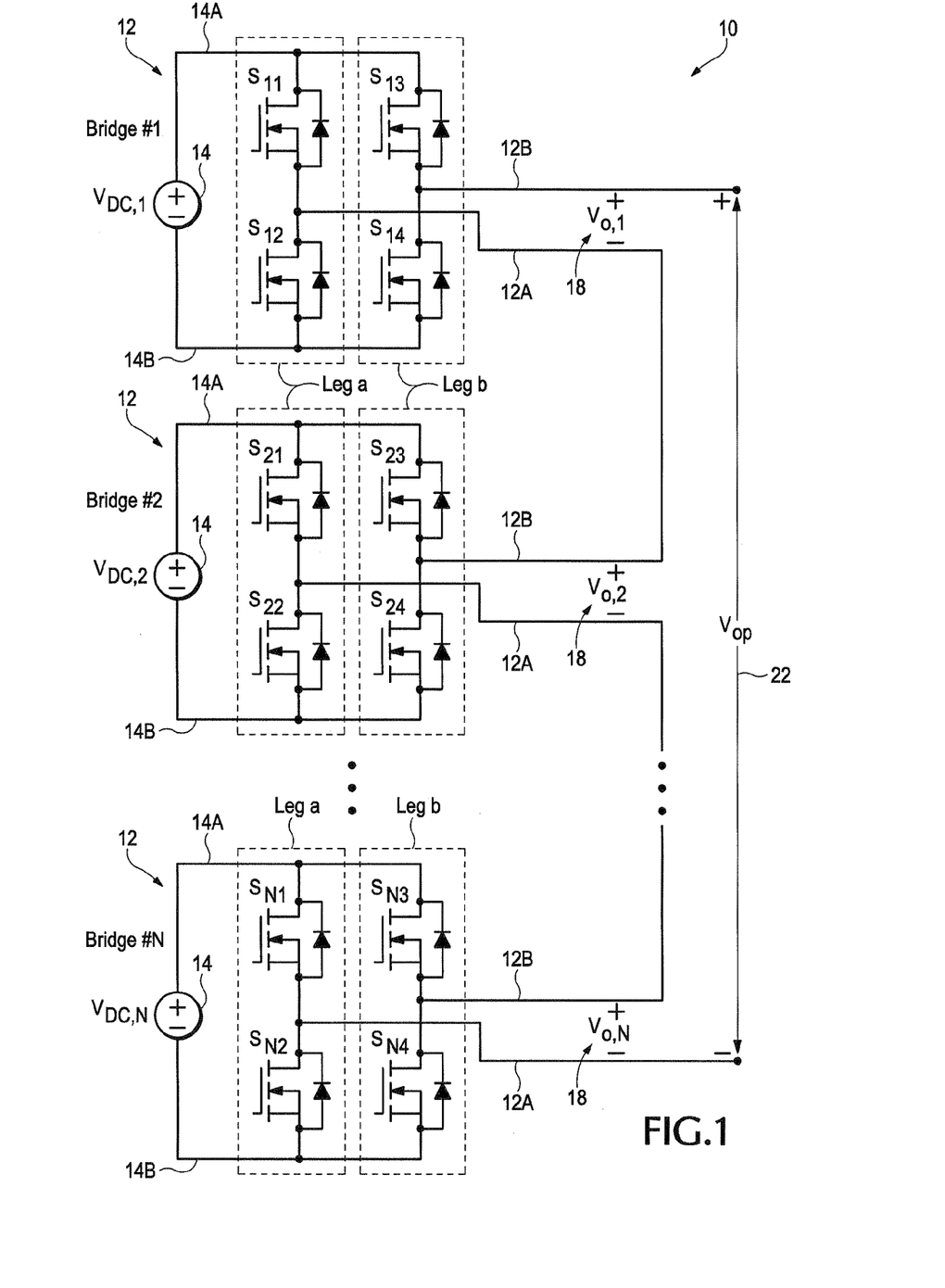
FIG. 1 is a diagram of a single-phase cascaded multilevel inverter.

FIG. 1 shows a single-phase cascaded inverter 10. The inverter 10 comprises N H-bridges 12 and is capable of producing (2N+1) voltage levels from a Direct Current (DC) power source 14. Each bridge 12 consists of switching gates $S_{k1}$-$S_{k4}$, (k=1, 2, N, where k is the $k^{th}$ bridge and N is the number of bridges) which are controlled in response to signals from a control board (not shown). Each switching gate $S_{k1}$-$S_{k4}$ may be fitted with an antiparallel diode to allow shorting current to flow. The switching gates in certain embodiments could use Insulated Gate Bipolar Transistor (IGBT) modules having four IGBTs or Metal Oxide Semiconductor Field Effect Transistor (MOSFET). However, other type of switching devices could also be used.

Activating gates $S_{13}$ and $S_{12}$ and deactivating gates $S_{11}$ and $S_{14}$ in Bridge #1 creates a voltage $V_{o,1}=V_{DC,1}$. Deactivating gates $S_{13}$ and $S_{11}$ and activating gates $S_{12}$ and $S_{14}$ in Bridge #1 shorts $V_{o,1}=0$.

The cascaded inverter topology requires that all the DC sources 14 be isolated from each other. This isolation feature allows the outputs of the H-bridges 12 to be added together vectorially. This fact is illustrated in FIG. 1. At any time instant t, $V_{o,1}$ (t), $V_{o,2}$ (t), $V_{o,N}$ (t) are the output voltages of Bridge #1, Bridge #2, . . . , Bridge #N, respectively. Since the DC sources 14 are isolated from each other, the inverter output voltage $V_{op}$ (t), is given by the sum of individual H-bridge output voltages and is expressed by the following equation:

$$V_{op}(t)=V_{o,1}(t)+V_{o,2}(t)+\ldots+V_{o,N}(t) \quad (1)$$

Figure 2:
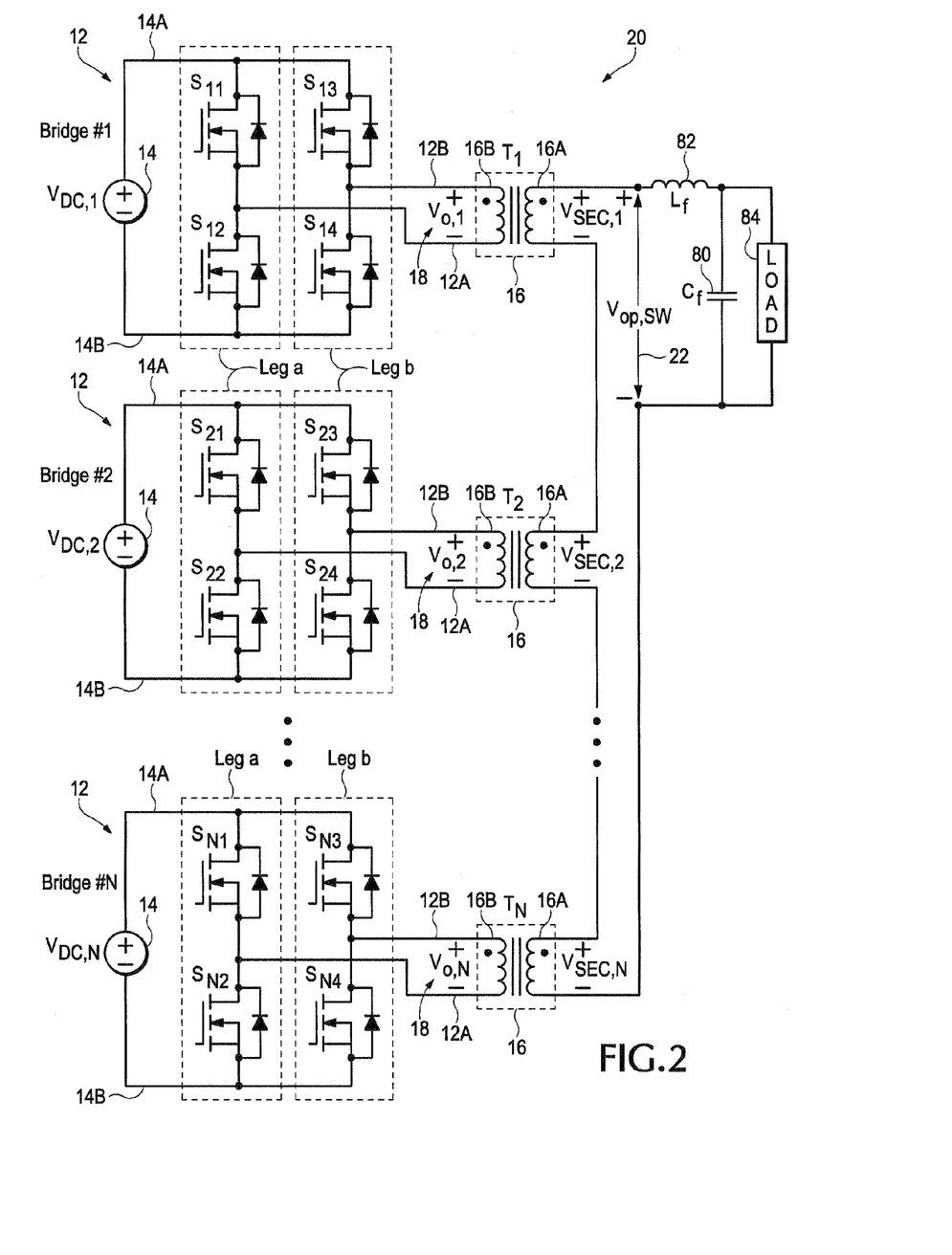
FIG. 2 is a diagram of a single-phase step wave inverter.

The schematic of a single-phase step wave power converter 20 with N H-bridges 12 is shown in FIG. 2. In general, each H-bridge 12 can be supplied from a separate DC source 14. This is shown in FIG. 2 where the DC voltage sources 14 for Bridge #1, Bridge #2, . . . , Bridge #N are represented by $V_{DC,1}$, $V_{DC,2}$, . . . $V_{DC,N}$ respectively. The inverter 20 also comprises of N transformers 16. The output of each bridge 12 is tied to the primary winding 16A of the corresponding transformer 16.

As seen in FIG. 2, Bridge #1, Bridge #2, . . . , Bridge #N are tied to the primary windings 16A of transformers $T_1$, $T_2$, . . . , $T_N$ respectively. The outputs 18 of Bridge #1, Bridge #2, . . . , Bridge #N are designated by $V_{o,1}$, $V_{o,2}$, . . . $V_{o,N}$ respectively, and the output voltage at the corresponding transformers 16 are designated by $V_{SEC,1}$, $V_{SEC,2}$, . . . $V_{SEC,N}$, respectively. The secondary windings 16B of all the transformers 16 are tied in series. The resultant inverter voltage 22, $V_{op,SW}$, is the sum of the transformer voltages. If at any given time instant t, the instantaneous transformer voltages are $V_{SEC,1}$ (t), $V_{SEC,2}$ (t), $V_{SEC,N}$ (t) then $V_{op,SW}$ (t) is given by:

$$V_{op,SW}(t)=V_{SEC,1}(t)+V_{SEC,2}(t)+\ldots+V_{SEC,N} \quad (2)$$

For both topologies in FIG. 1 and FIG. 2, the output voltages of the individual H-bridges 12 are isolated from each other and thus can be added up to yield the resultant inverter voltage. For this to happen in a cascaded inverter 10 in FIG. 1, the DC sources 14 for the individual H-bridges 12 are isolated from each other. This allows the output of one H-bridge 12 to feed into the next H-bridge 12 without causing any circulating currents.

In the case of a Step Wave Inverter 20 in FIG. 2, the DC sources 14 may or may not be isolated from each other. However, the outputs of the individual H-bridges 12 are isolated from the rest of the bridges in the inverter 20 through the use of transformers 16. In both the cascaded inverter 10 and the Step Wave Inverter 20, the outputs 18 of the individual H-bridges 12 are isolated from the rest of the bridges. Since in both the cascaded inverter and the Step Wave Inverter the outputs of the individual H-bridges are isolated from the rest of the bridges, and also because the individual H-bridge outputs get combined to give the resultant inverter voltage, similar PWM techniques can be employed for both the topologies. Applying the same gating signals to control the power transistors in the two topologies will result in inverter waveforms that are identical to each other, differing only in magnitude. This underlying principle is used in this invention whereby a PWM technique commonly used for Cascaded Multilevel inverter is applied for the Step Wave Inverter.

PSCPWM Scheme for Cascaded Inverters

For the case of operation of one single-phase H-bridge inverter 10 with 3-level naturally sampled modulation, the analytical solution for all the harmonics is known. It has also been shown that for series-connected single-phase bridges some dominant harmonics can be cancelled by appropriately phase-shifting the carriers for the bridges. This modulation process is denoted as phase-shifted carrier PWM, or PSCPWM.

The underlying principle of PSCPWM is to retain sinusoidal reference waveforms for the two phase legs of each H-bridge 12 that are phase shifted by 180° and then to phase shift the carriers of each bridge to achieve additional harmonic cancellation around the even carrier multiple groups.

Figure 3:
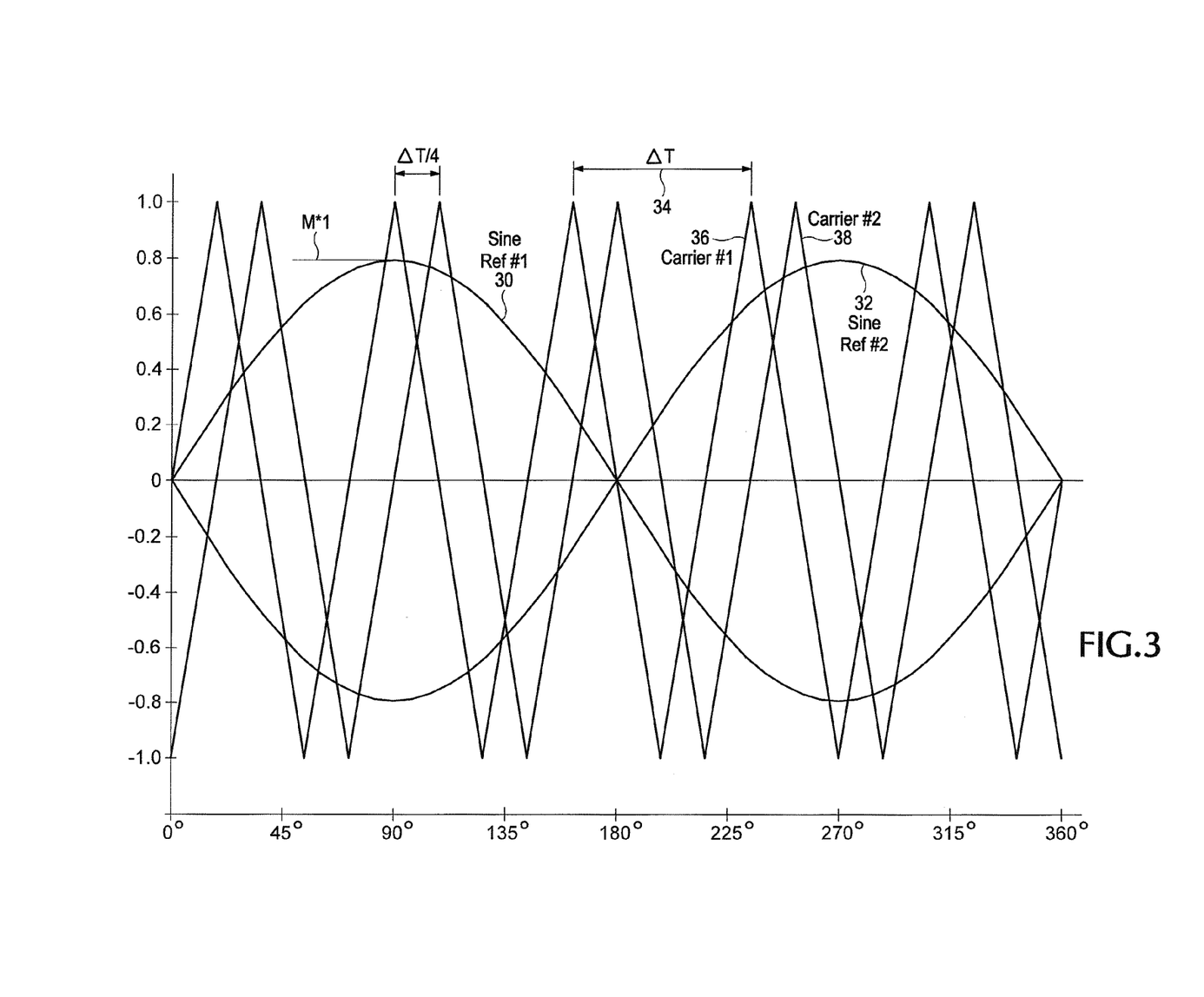
FIG. 3 is a diagram showing a phase-shifted carrier PWM scheme.

To illustrate, FIG. 3 shows the carrier waveforms 36 and 38 and reference waveforms 30 and 32 for the 2 single-phase H-bridges 12 that are connected in series to form a 5-level cascaded inverter. FIG. 3 shows two sinusoidal reference waveforms 30 and 32. Each waveform is assigned for one leg of the H-bridge 12. For instance, in FIG. 3 Sine Ref #1 is used as a reference for Leg a for both the H-bridges in the inverter 10, and Sine Ref #2 is used as a reference for Leg b for both the H-bridges 12. Sine Ref #1 and Sine Ref #2 are phase shifted by 180°. FIG. 3 also shows the carriers, Carrier #1 and Carrier #2 that are the carrier waveforms for Bridge #1 and Bridge #2 respectively.

In general, a cascaded inverter 10 with N bridges 12 will have N carriers where Carrier #1, Carrier #2 , . . . , Carrier #N are the carrier waveforms for Bridge #1, Bridge #2, . . . , Bridge #N respectively. The two reference waveforms 30 and 32 are phase shifted from each other by 180°, and each reference waveform is assigned to one leg of the H-bridges, as discussed for the case of 5-level inverter. As before, Sine Ref #1 is used as a reference for Leg a of all the N H-bridges in the inverter, and Sine Ref #2 is used as a reference for Leg b for all the N H-bridges in the inverter.

In FIG. 3, the carrier frequency is chosen as 5 times the reference waveform frequency for illustration purposes. For actual inverter operation the carrier frequency is typically a few tens to a few hundreds of times the fundamental frequency. FIG. 3 also shows the normalized amplitudes of the carrier waveforms 36 and 38 and reference waveforms 30 and 32 as 1 and M respectively, where M is the modulation index, and $0 \leq M \leq 1$.

Modulation index M is the ratio of peaks of the carrier and reference waveforms. In other words, for a single H-bridge 12, a modulation index of M will result in an output voltage with peak of $M*V_{DC}$, and the fundamental component of this output voltage has a RMS value of $M*V_{DC}/\sqrt{2}$. For N cascaded bridge inverters 10 operating with DC voltage $V_{DC}$, the RMS value of the fundamental component of the output voltage is given by:

$$V_{op,CASC\_RMS} = \frac{N*M*V_{DC}}{\sqrt{2}} \qquad (3)$$

The output voltage waveform also contains harmonics due to switching action of the converter. For sine PWM the dominant harmonics are located near the multiples of the switching frequency. For cascaded bridges, PSCPWM can be used be cancel some of these harmonics. Theoretical analysis has shown that optimum harmonic cancellation is achieved by phase shifting each carrier by $(i-1) \pi/N$, where i is the $i^{th}$ H-bridge and N is the number of series-connected H-bridges.

Therefore, for two cascaded H-bridges 12, the carriers need to be phase shifted by 90°, for three cascaded H-bridges the carriers need to be phase shifted by 60°, and so on. In other words if the carrier waveforms 36 and 38 have periods of ΔT, then for two cascaded H-bridges 12, the carriers need to be phase shifted by ΔT/4, for three cascaded H-bridges the carriers need to be phase shifted by ΔT/6, and so on. This is illustrated in FIG. 3 where the carriers 36 and 38 for two cascaded H-bridges 12 are shown phase shifted by ΔT/4. It should be noted here that in order for harmonic cancellation to take place all the DC voltage sources should have the same magnitude, i.e.

$$V_{DC,1} = V_{DC,2} = \ldots = V_{DC,N} = V_{DC} \qquad (4)$$

FIG. 3 shows the "naturally sampled" sine-triangle modulation, which is quite difficult to implement in a digital modulation system. The modern popular alternative is to implement the modulation system using a "regular sampled" PWM strategy, where the low-frequency reference waveforms 30 and 32 are sampled and then held constant during each carrier interval. These sampled values are compared against the triangular carrier waveforms 36 and 38 to control the switching process of each phase leg, instead of the sinusoidally varying reference.

For triangular carriers 36 and 38, sampling can be symmetrical or asymmetrical. For symmetrical sampling, the references 30 and 32 are sampled at either the positive or negative peaks of the carriers 36 and 38 and then held constant for the entire carrier interval. For asymmetrical sampling the references 30 and 32 are sampled every half carrier 36 and 38 at both the positive and negative carrier peaks.

Sampling the reference signals 30 and 32 produce a stepped waveform which is phase delayed with respect to the original reference waveforms 30 and 32. For symmetrical sampling, this delay is one half the carrier interval, while for asymmetrical sampling this delay is one quarter the carrier interval.

In the digital implementation this phase delay can be compensated by phase advancing the reference waveforms 30 and 32 by the appropriate time interval. The most common implementation for a digital PWM controller is using a digital controller around a microcontroller or a Digital Signal Processor (DSP). Good harmonic performance may be achieved by using 3-level asymmetrical regular sampled PWM for each H-bridge 12 in the cascaded inverter 10. The waveform synthesis for the cascaded converter 10 and step wave converter 20 may be similar. Therefore the 3-level asymmetrical regular sampled PWM is used for also implementing PSCPWM for the step wave inverter.

Figure 4:
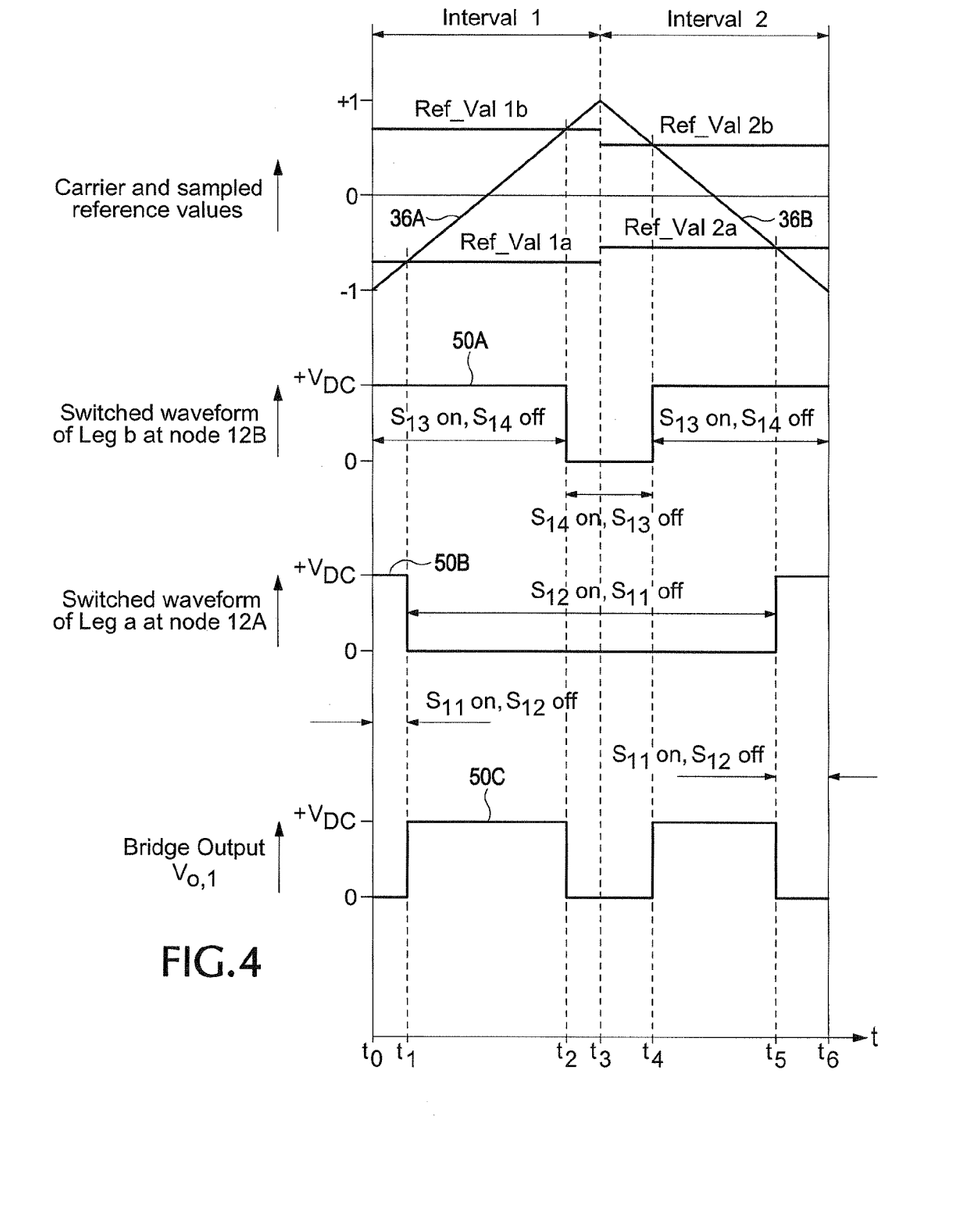
FIG. 4 shows an asymmetrically sampled sine-triangle PWM scheme.

FIG. 4 shows the switching waveforms for both legs of an H-bridge 12, selected as Bridge #1 in FIG. 1 for illustration. FIG. 4 shows two half-periods 36A and 36B of the carrier wave 36, labeled Interval 1 and Interval 2 respectively.

The reference waveform samples for Leg a corresponding to Interval 1 and Interval 2 are Ref_Val 1a and Ref_Val 2a respectively, and the reference waveform samples for Leg b corresponding to Interval 1 and Interval 2 are Ref_Val 1b and Ref_Val 2b respectively. The reference samples are obtained after adjusting for the one quarter of the carrier period introduced due to sampling.

As can be seen, the switched waveforms for each leg are obtained by comparing the carrier wave 36 with the reference sample values. Each phase leg of the inverter switches to the upper DC rail ($V_{DC}$) 14A when the reference value Ref_Val 1a, Ref_Val 2a, Ref_Val 1b, or Ref_Val 2b exceeds the carrier wave 36, and switches to the lower DC rail (0) 14B when the reference value falls below the carrier.

Following this scheme, the control signals for the power transistors can be generated. For the H-bridge under example (Bridge #1 of the cascaded inverter shown in FIG. 1) the states of the switches in the H-bridge corresponding to the switching waveforms are as indicated in FIG. 4.

Waveform 50A shows the output voltage of Leg b at node 12B. During Interval 1 the reference value Ref_Val 1b exceeds the carrier waveform 36A for the time interval $t_0$-$t_2$. Accordingly, the output voltage at node 12B is set to $+V_{DC}$ during the time interval $t_0$-$t_2$ by activating switch $S_{13}$ (i.e. turning the switch ON) and deactivating switch $S_{14}$ (i.e. turning the switch OFF). During time interval $t_2$-$t_3$ the carrier waveform 36A exceeds the reference value Ref_Val 1*b*. Accordingly, the output voltage at node 12B is set to 0 during the time interval $t_2$-$t_3$ by activating switch $S_{14}$ (i.e. turning the switch ON) and deactivating switch $S_{13}$ (i.e. turning the switch OFF). During Interval 2 carrier waveform 36B exceeds the reference value Ref_Val 2*b* for the time interval $t_3$-$t_4$. Accordingly, the output voltage is set to 0 during the time interval $t_3$-$t_4$ by activating switch $S_{14}$ and deactivating switch $S_{13}$. During time interval $t_4$-$t_6$ the reference value Ref_Val 2*b* exceeds the carrier waveform 36B. Accordingly, the output voltage is set to $+V_{DC}$ during the time interval $t_4$-$t_6$ by activating switch $S_{13}$ and deactivating switch $S_{14}$.

Waveform 50B shows the output voltage of Leg a at node 12A. During Interval 1 the reference value Ref_Val 1*a* exceeds the carrier waveform 36A for the time interval $t_0$-$t_1$. Accordingly, the output voltage at node 12A is set to $+V_{DC}$ during the time interval $t_0$-$t_1$ by activating switch $S_{11}$ and deactivating switch $S_{12}$. During time interval $t_1$-$t_3$ the carrier waveform 36A exceeds the reference value Ref_Val 1*a*. Accordingly, the output voltage at node 12A is set to 0 during the time interval $t_t$-$t_3$ by activating switch $S_{12}$ and deactivating switch $S_{11}$. During Interval 2 carrier waveform 36B exceeds the reference value Ref_Val 2*a* for the time interval $t_3$-$t_5$. Accordingly, the output voltage is set to 0 during the time interval $t_3$-$t_5$ by activating switch $S_{12}$ and deactivating switch $S_1$ During time interval $t_5$-$t_6$ the reference value Ref_Val 2*a* exceeds the carrier waveform 36B. Accordingly, the output voltage is set to $+V_{DC}$ during the time interval $t_5$-$t_6$ by activating switch $S_{11}$ and deactivating switch $S_{12}$.

The combination of waveforms 50A and 50B produce waveform 50C where the output of Bridge #1 ($V_{op,1}$) is equal to 0 during the time interval $t_o$-$t_1$, moves to $V_{DC}$ during the time interval $t_1$-$t_2$, moves to 0 during the time interval $t_2$-$t_4$, moves to $V_{DC}$ during the time interval $t_4$-$t_5$, moves to 0 during the time interval $t_5$-$t_6$ etc.

Figure 5:
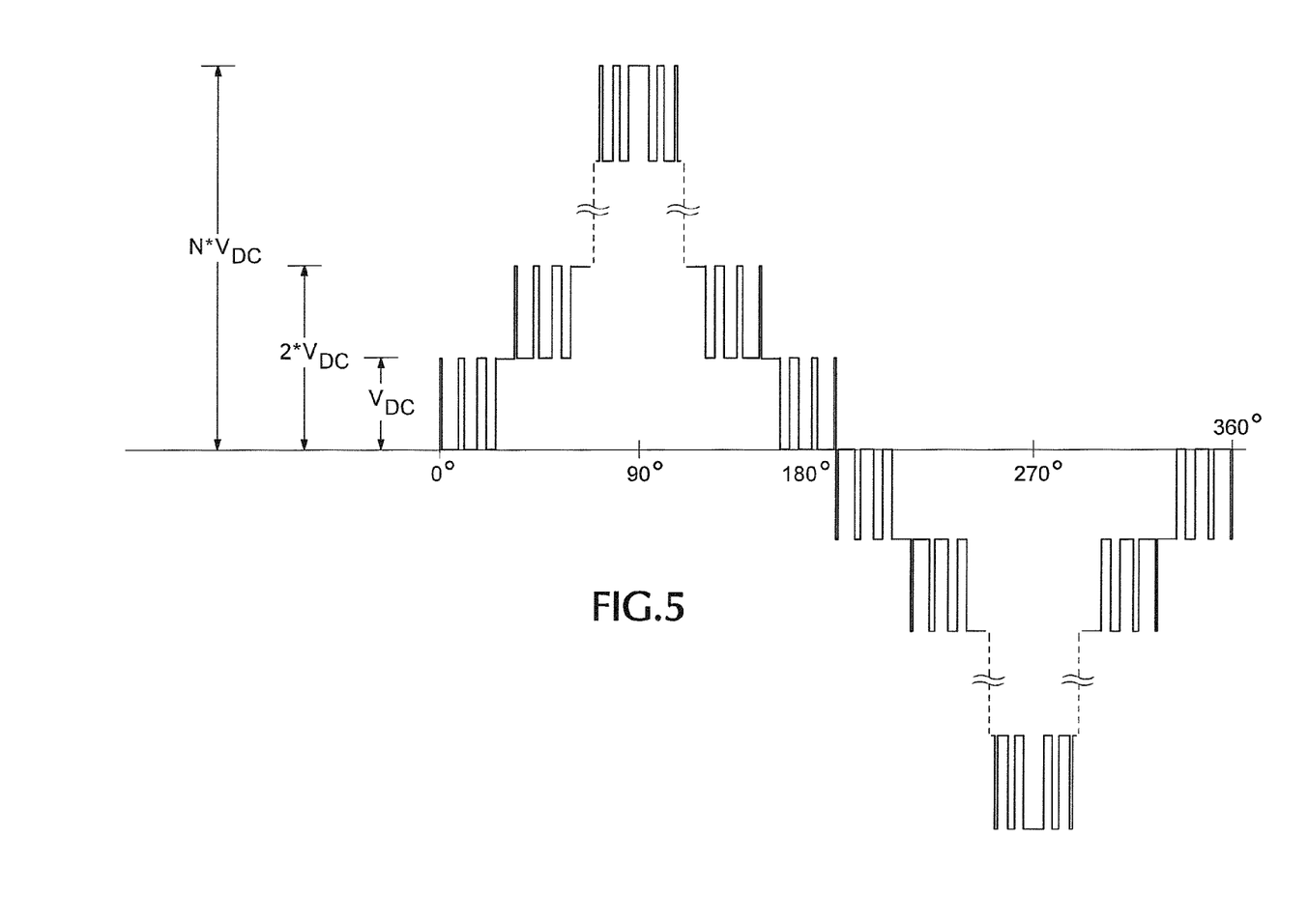
FIG. 5 shows an output voltage from a cascaded inverter.

FIG. 5 shows a sketch of the cascaded inverter output voltage, $V_{op,CASC}$, before any filtering is performed. It can be seen that the resulting inverter voltage comprises of (2N+1) levels, and each level has the magnitude $V_{DC}$.

Using PSCPWM in Step Wave Conversion

The PSCPWM is selected for the single-phase configuration of step wave inverter for stand-alone application whereby the converter performs DC-AC power conversion to supply a local load. The details of implementation of PSCPWM for a 5-level step wave inverter given below show that the inherent transformer leakage inductance can be used to eliminate external inductance and filter the output voltage.

Referring again to FIG. 2, the PSCPWM described above for cascaded inverter 10 in FIG. 1 can also be used with the step wave power converter 20 shown in FIG. 2. As mentioned for the case of the cascaded inverter, the desired harmonic elimination can be attained when all the DC voltage sources 14 have the same magnitude. This condition has been expressed earlier by Eq. 4. In practice this condition is directly achieved by tying all the H-bridges 12 to the same DC source 14 with magnitude, say $V_{DC}$.

Any DC voltage source 12 can be used e.g. a battery bank, a photovoltaic array, a fuel cell etc. The N transformers 16 that are part of the inverter 20 are identical, with the primary to secondary winding ratio 1:R. Thus a pulse of $V_{DC}$ on the primary 16A of any transformer 16 will result in a voltage pulse of $R*V_{DC}$ on the secondary winding 16B of the transformer 16.

In applying the PSCPWM technique to the step wave inverter 20, the sine-triangle modulation and the generation of gating signals for the power transistors is the same as the cascaded inverter. As mentioned previously, the 3-level asymmetrical regular sampled PWM provides good harmonic performance for implementing PSCPWM.

Figure 6:
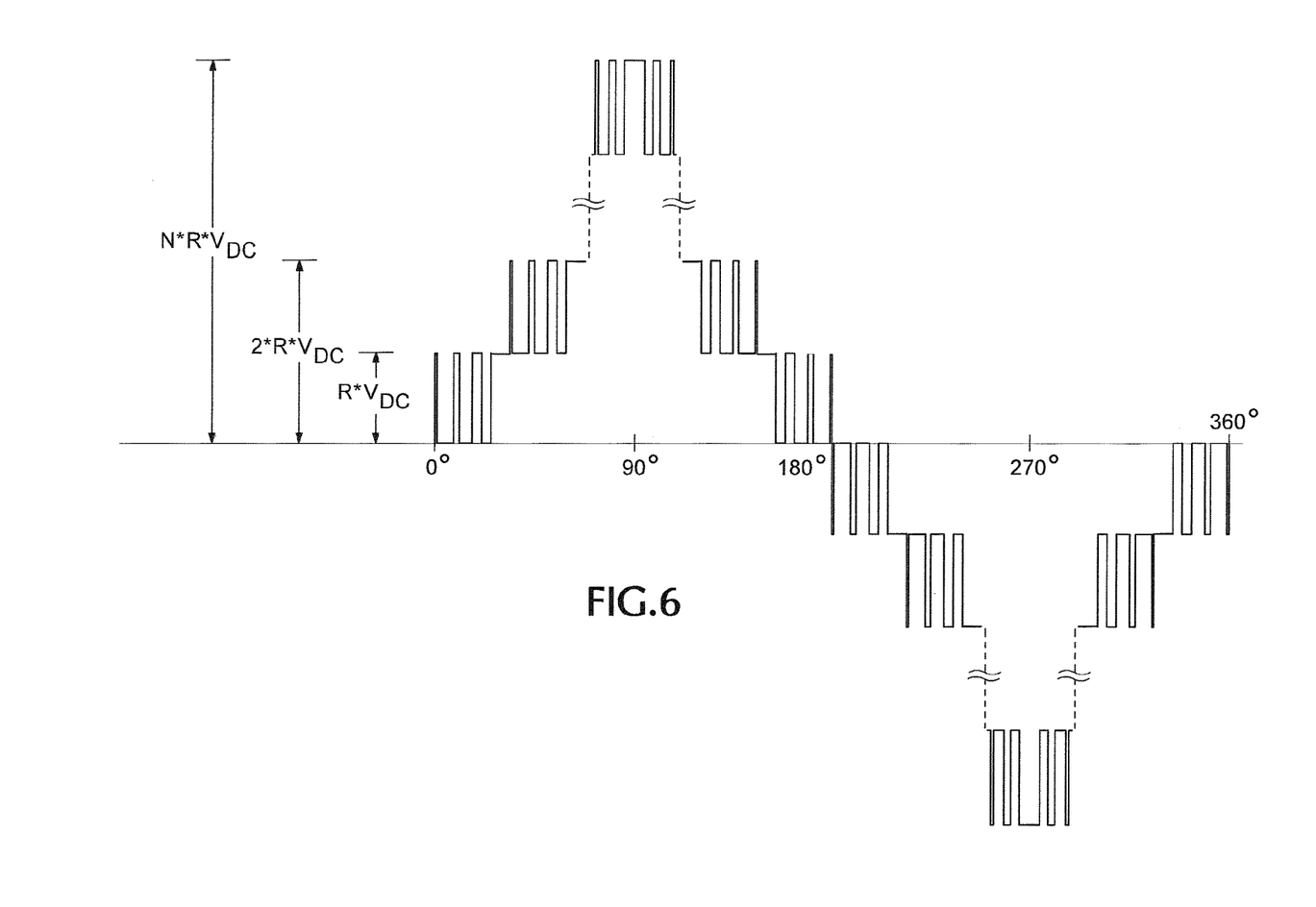
FIG. 6 shows an output voltage from the step wave inverter shown in FIG. 2.

A sketch of the resulting inverter voltage before any filtering is performed is shown in FIG. 6. As with the cascaded inverter, the inverter voltage comprises of 2N+1 levels. A comparison of FIG. 5 and FIG. 6 shows that there is a difference in the magnitude of each level. For the step wave inverter the presence of transformers results in each level being of the magnitude $R*V_{DC}$.

For cascaded inverter 10 (FIG. 1) operating with a modulation index M the expression for the RMS value of the fundamental component of the output voltage has been given in Eq. 3. Following the discussion above, for a step wave inverter 20 operating with a modulation index M, the expression for the RMS value of the fundamental component of the output voltage is given by:

$$V_{op,SW\_RMS} = \frac{N*M*V_{DC}*R}{\sqrt{2}} \quad (5)$$

The PSCPWM scheme was tested with a 3-level asymmetrical regular sampling on a prototype single-phase step wave inverter 20. The prototype was designed for operation with high-density Li-ion battery pack. The AC output 22 of the inverter 20 was 120V, 60 Hz, 2.4 kW continuous output power. The inverter 20 can be designed for 5-level operation i.e. with 2 H-bridges and 2 transformers. One implementation used DC and AC operating voltages resulting in transformer voltage ratio of 1:1.43. The carrier frequency was chosen as 4500 Hz, thus yielding a carrier to fundamental ratio of 4500/60=75.

Figure 7:
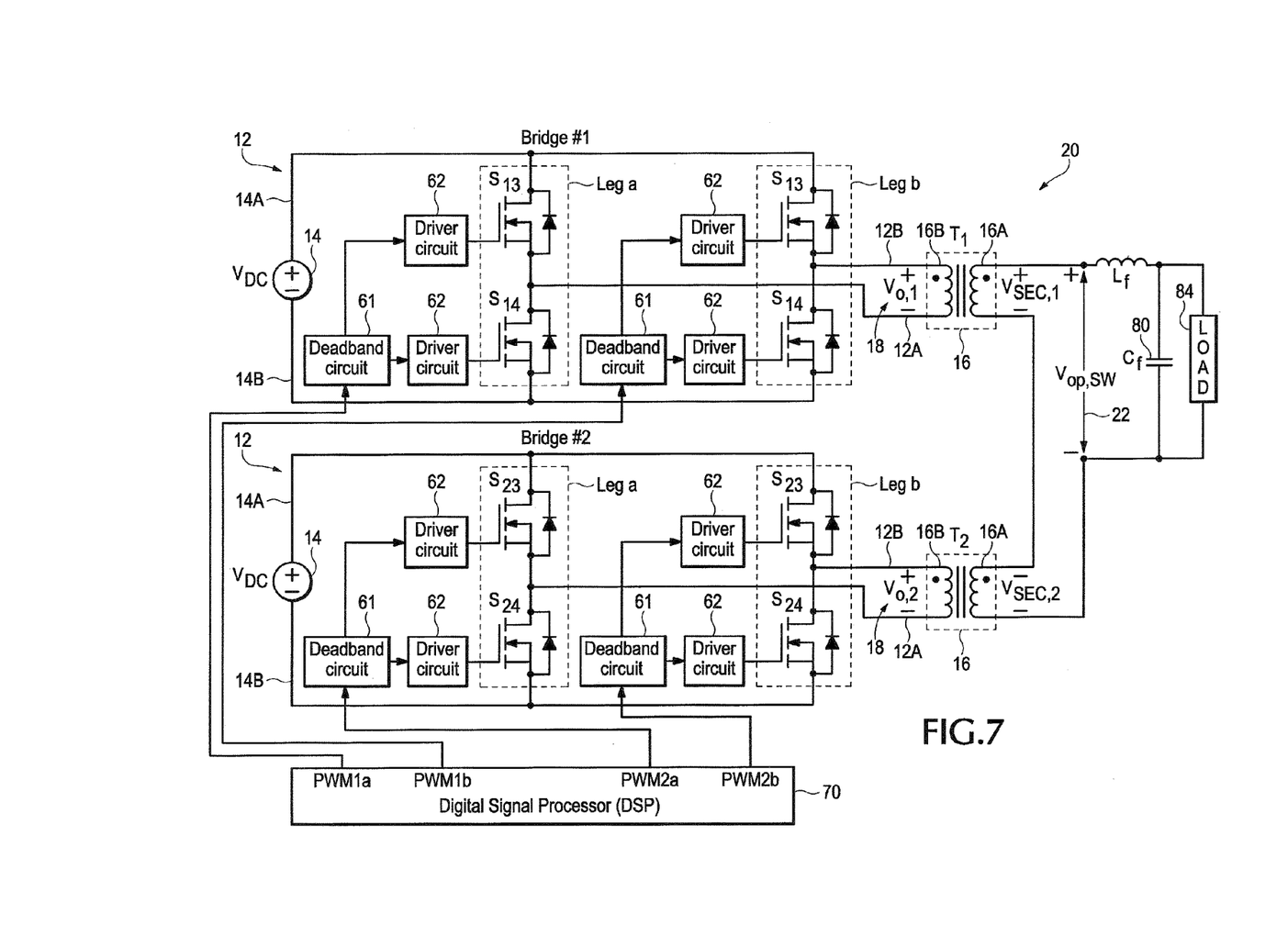
FIG. 7 shows the diagram of a 5-level step wave inverter.

A digital implementation of PSCPWM is carried out as shown in FIG. 7 using a digital signal processor (DSP) 70. The two reference waveform tables can be stored in on-chip memory as look-up tables. The PWM signals for controlling the switches in the inverter can be generated by encoding the asymmetrically sampled sine-triangle PWM scheme illustrated in FIG. 4 that has already been described above. In FIG. 7, the PWM signals for Leg a and Leg b for Bridge #1 are labeled as PWM1*a* and PWM1*b* respectively and the PWM signals for Leg a and Leg b for Bridge #2 are labeled as PWM2*a* and PWM2*b* respectively. FIG. 7 also shows the block for deadband circuit 61 for generating control signals for switches, and the block for driver circuit 62 for the necessary gate drive.

Figure 8:
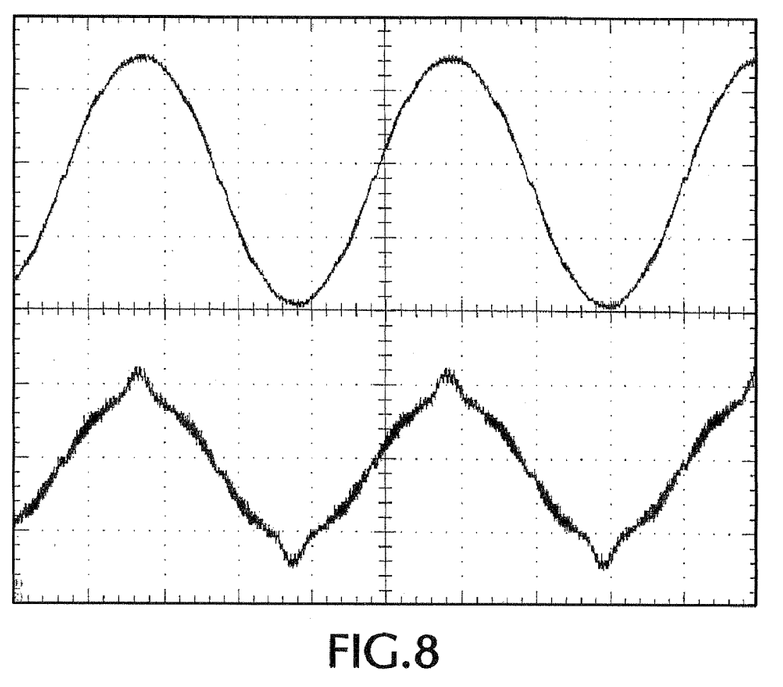
FIG. 8 shows waveforms from a 5-level step wave inverter

FIG. 8 shows the load voltage and load current for the 5-level step wave inverter for a non-linear load comprising of 2 computers and a resistive load bank. For stand-alone inverter operation it is expected that the inverter 20 will supply a near-sinusoidal voltage to an AC load. The limits for the different voltage harmonics are specified in IEEE 519-1992 standard.

In order to attain a sine-wave quality and reduce the harmonic content in the output voltage for all stand-alone inverters, some sort of filtering is applied in the output 22 in FIG. 2. This kind of filtering can be achieved by some combination of inductors and capacitors. FIG. 2 shows a simple LC-filter 80, 82 comprised of the components $L_f$ and $C_f$ and a load 84 at the output 22 of the step wave inverter 20.

The size and values of the filter components 80 and 82 depend upon the magnitude of harmonics present in the output voltage and the level of attenuation desired. A high harmonic content in the output voltage 22 results in large $L_f$ and $C_f$. The superior harmonic performance of the PSCPWM scheme results in output voltage that inherently has a low harmonic content. This ensures that the filter components $L_f$ and $C_f$ are small.

Furthermore, from FIG. 2, it can be seen that the leakage inductance of the transformers 16 is in series with the filter inductance 82. If each transformer 16 has an equivalent leakage inductance of $L_\sigma$ referred to the secondary side 16B of the transformers 16, then for N transformers 16 the total filter inductance is given by:

$$L_{filter} = L_f + (N * L_\sigma)$$

Thus, it can be seen that the transformer leakage inductance contributes to the total filter inductance. This can be used to reduce the size of the external inductance, $L_f$. With a proper choice of the filter capacitance, $C_f$, it is possible to eliminate $L_f$. This useful feature is demonstrated on a prototype step wave inverter with PSCPWM. The leakage inductance of each transformer is measured to be 60 μH, giving a total of 120 μH for the 2 transformers 16. It is found that using only the leakage inductance of the transformers and a 15 μf filter capacitor gives excellent power quality for the output voltage for different kinds of loads. As can be seen in FIG. 6 the load voltage is nearly sinusoidal and meets all the limits for harmonics specified in IEEE 519-1992.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A step wave power converter comprising:
a processor configured to:
operate bridge circuits;
modulate at least one direct current DC input with the bridge circuits to form multiple individual voltage steps of a step wave Alternating Current (AC) output;
associate different carrier waves with the bridge circuits that have frequencies that are multiple times greater than a frequency of a reference waveform and are independent of the voltage steps of the AC output formed by the bridge circuits; and
modulate with the bridge circuit variable width pulses onto the voltage steps of the AC output according to a comparison of the carrier waves with different points in the reference waveform.

2. The step wave power converter of claim 1 wherein the processor is further configured to asymmetrically sample the reference waveform with the carrier waves to determine when to selectively have the bridge circuits connect the DC input to a transformer.

3. The step wave power converter of claim 1, wherein:
different carrier wave values are associated with different bridge circuits;
a first set of reference waveform values corresponding to a first reference waveform are used for comparing with the carrier wave values for one of the carrier waves and for selectively turning on a first pair of switches for a first leg for one of the bridge circuits couple to a positive output terminal; and
a second set of reference waveform values corresponding to a second reference waveform phase shifted from the first reference waveform, are used for separately comparing with the carrier wave values and selectively turning on a second pair of switches generated for a second leg for one the bridge circuits coupled to a negative output terminal.

4. The step wave converter of claim 1, wherein:
the different carrier waves are phase shifted in relation to each other according to a total number of bridge circuits; and
a first reference wave form and a second reference waveform are compared with the different carrier waves and are phase shifted in relation to each other.

5. The step wave power converter of claim 1, wherein the bridge circuits include:
a first switch coupled between a positive power source terminal and a negative output terminal;
a second switch coupled between a negative power source terminal and the negative output terminal;
a third switch coupled between the positive source terminal and a positive output terminal; and
a fourth switch coupled between the negative power source terminal and the positive output terminal.

6. The step wave power converter of claim 5, wherein the processor is further configured to:
deactivate the first switch and activate the second switch when a first reference waveform value for a first reference waveform exceeds a value of an associated one of the carrier waves;
deactivate the third switch and activate the fourth switch when a second reference waveform value for a second reference waveform phase shifted from the first reference waveform exceeds the value of the associated one of the carrier waves;
activate the third switch and deactivate the fourth switch when a third reference waveform value for the second reference waveform exceeds the value of the associated one of the carrier waves; and
activate the first switch and deactivate the second switch when a fourth reference waveform value for the first reference waveform exceeds the value of the associated one of the carrier waves.

7. The step wave power converter of claim 1 wherein the processor generates the carrier waves and the reference waveform.

8. The step wave power converter according to claim 1 including:
- a plurality of transformers each configured to receive a Direct Current (DC) voltage from one or more independently generated power sources, wherein outputs of the bridge circuits are coupled to primary windings of the transformers; and
- a filter is coupled to outputs of the transformers to reduce harmonics in the AC output.

9. The step wave power converter according to claim 8 where leakage inductance in the transformers is configured to reduce an amount of inductance used in the filter.

10. A method, comprising:
- receiving a Direct Current (DC) voltage input at a step wave power converter;
- converting the DC voltage input into a plurality of steps of a step wave Alternating Current (AC) waveform;
- comparing one or more carrier waves associated with the steps of the AC waveform with one or more reference waves; and
- modulating variable width pulses onto the steps of the step wave AC waveform according to the comparison between the carrier waves and the reference waves.

11. The method of claim 10 further comprising connecting or disconnecting the DC voltage input to a transformer according to the comparison between the one or more of the carrier waves with the reference waves.

12. The method of claim 10 further comprising:
- generating reference waveform values;
- generating carrier waveform values; and
- comparing the reference waveform values with the carrier waveform values to determine when to apply the DC voltage as the steps in the AC waveform.

13. The method of claim 12 further comprising:
- generating a first set of reference waveform values for a first group of switches in the power converter for modulating the DC voltage into the AC waveform; and
- generating a second set of asymmetric reference waveform values for a second group of switches in the power converter for modulating the DC voltage into the AC waveform.

14. The method according to claim 13 including offsetting the phase between the first and the second set of reference waveform values by 180 degrees.

15. The method of claim 10 further comprising filtering the AC waveform.

16. The method of claim 15 including using transformer leakage inductance to reduce an amount of inductance required to filter the AC waveform.

17. An apparatus, comprising:
a modulation circuit configured to:
- compare reference waveform values with phase shifted carrier waveform values;
- selectively connect and disconnect a DC voltage to generate DC voltage step waves of an Alternating Current (AC) output; and
- generate variable width pulses on either side of the DC voltage step waves according to the comparison between the reference waveform values with the carrier waveform values.

18. The apparatus of claim 17 wherein the reference waveform values represent a sinusoidal waveform and the carrier waveform values represent a triangular waveform.

19. The apparatus of claim 17 wherein the reference waveform values comprise two 180° phase shifted sinusoidal reference waveforms and the carrier waveform values comprise different phase shifted triangular waveforms.

20. The step wave power converter according to claim 17 wherein:
- a first set of the reference waveform values correspond to a first reference waveform and are used for comparing with the carrier waveform values and selectively turning on a first pair of switches for a first leg of a bridge circuit coupled to a positive output terminal of the bridge circuit; and
- a second set of the reference waveform values correspond to a second reference waveform phase shifted from the first reference waveform and used for separately comparing with the carrier waveform values and selectively turning on a second pair of switches for a second leg of the bridge circuit coupled to a negative output terminal of the bridge circuit.

\* \* \* \* \*